US009900491B2

United States Patent
Zarudniev et al.

(10) Patent No.: US 9,900,491 B2
(45) Date of Patent: Feb. 20, 2018

(54) METHOD AND SYSTEM FOR AUTOMATICALLY FOCUSING A CAMERA

(71) Applicant: COMMISSARIAT A L'ENERGIE ATOMIQUE ET AUX ENERGIES ALTERNATIVES, Paris (FR)

(72) Inventors: Mykhailo Zarudniev, Kiev (UA); Suzanne Lesecq, Froges (FR); Arnaud Tonda, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 6 days.

(21) Appl. No.: 15/068,274

(22) Filed: Mar. 11, 2016

(65) Prior Publication Data

US 2016/0277667 A1 Sep. 22, 2016

(30) Foreign Application Priority Data

Mar. 20, 2015 (FR) ..................................... 15 52334

(51) Int. Cl.
*H04N 5/232* (2006.01)
*G02B 7/09* (2006.01)
(Continued)

(52) U.S. Cl.
CPC .......... *H04N 5/23212* (2013.01); *G02B 7/09* (2013.01); *G02B 7/36* (2013.01); *G02B 7/38* (2013.01); *G03B 13/36* (2013.01)

(58) Field of Classification Search
CPC ... G02B 7/09; G02B 7/38; G02B 7/36; G03B 13/36; H04N 5/23212
See application file for complete search history.

(56) References Cited

U.S. PATENT DOCUMENTS 4,873,543 A * 10/1989 Matsuzaki ............... G02B 7/36
396/133
5,923,371 A 7/1999 Iijima
(Continued)

OTHER PUBLICATIONS

J. He et al., "Modified Fast Climbing Search Auto-focus Algorithm with Adaptive Step Size Searching Technique for Digital Camera," IEEE Transaction on Consumer Electronics, vol. 49, No. 2, 2003, pp. 257-262.
(Continued)

Primary Examiner — Timothy J Henn
(74) Attorney, Agent, or Firm — Baker Hostetler LLP

(57) ABSTRACT

A method for automatically focusing a camera comprising an image sensor, at least one lens configured to project an image onto the sensor and an actuator configured to modify a focusing parameter of the lens, comprises: a first phase of controlling the actuator in an open loop so the focusing parameter successively takes a plurality of predefined values, images being acquired for each value of the focusing parameter and a sharpness indicator being calculated on the basis of each image; and a second phase of controlling the actuator in a closed loop to maximize the sharpness indicator, the second closed-loop control phase being implemented by making use of a control law and starting conditions determined on the basis of the sharpness indicators calculated during the first phase. A system for automatically focusing a camera for implementing the method, and a camera equipped with such a system is provided.

15 Claims, 8 Drawing Sheets

(51) Int. Cl.
    *G02B 7/36*     (2006.01)
    *G02B 7/38*     (2006.01)
    *G03B 13/36*     (2006.01)

(56) References Cited

U.S. PATENT DOCUMENTS

| | | |
|---|---|---|
| 6,292,256 B1 | 9/2001 | Yoshida |
| 2009/0160999 A1 | 6/2009 | Nishimura |
| 2010/0040355 A1* | 2/2010 | Craen ............... G03B 13/32 396/90 |
| 2011/0069190 A1 | 3/2011 | Chou |
| 2014/0043702 A1* | 2/2014 | Yagi .................. G02B 7/02 359/823 |
| 2015/0271386 A1* | 9/2015 | Schneider ........... H04N 5/2254 348/349 |

OTHER PUBLICATIONS

L. Chiu et al., "An Efficient Auto Focus Mthod for Digital Still Camera Based on Focus Value Curve Prediction Model," Journal of Information Science and Engineering, vol. 26, No. 4, 2010, pp. 1261-1272.

S. Pertuz et al., "Analysis of focus measure operators for shape-from-focus," Pattern Recognition, vol. 46, No. 5, 2013, pp. 1415-1432.

N. Kehtarnavaz et al., "Development and real-time implementation of a rule-based auto-focus algorithm," Real-Time Imaging, 9 (3), 2003, pp. 197-203.

M. Trivedi et al., "A No-Reference Image Quality Index for Contrast and Sharpness Measurement," 2013 3rd IEEE International Advance Computing Conference (IACC), pp. 1234-1239.

* cited by examiner

METHOD AND SYSTEM FOR AUTOMATICALLY FOCUSING A CAMERA

CROSS-REFERENCE TO RELATED APPLICATION

This application claims priority to foreign French patent application No. FR 1552334, filed on Mar. 20, 2015, the disclosure of which is incorporated by reference in its entirety.

FIELD OF THE INVENTION

The invention pertains to a method for automatically focusing a camera, or to an autofocus. The invention also pertains to an automatic focusing system implementing such a method, and to a camera—and more specifically a digital camera—equipped with such a system.

BACKGROUND

In the literature and on the market, many automatic focusing methods exist, which may be grouped into two big families: open-loop and the closed-loop approaches.

Open-loop approaches require a distance sensor, for example a time-of-flight sensor; for this reason they are also known as "active" approaches. An open-loop controller receives, as input, a signal issued from this sensor, representing the distance of a subject to be imaged, and uses it to generate a signal for controlling an actuator that acts upon a focusing parameter of the camera. The latter may be the distance between a lens and an image sensor, or indeed the vergence of the lens if the latter is deformable. Typically, the controller merely applies a predefined lookup table matching a distance measured by the sensor to a voltage or current level, delivered to the actuator. One advantage of this approach is that it is very fast. However, it has many drawbacks: the extra cost linked to the use of an active distance sensor, the need for a calibration to be carried out in order to construct the lookup table of the open-loop controller and for it to be repeated periodically in order to compensate for the drift of the optical module and of the actuator, and sensitivity to non-measurable disturbances that prevent a level of precision from being guaranteed (lack of robustness). An exemplary open-loop, or active, autofocus is given in the document U.S. Pat. No. 6,292,256.

Closed-loop approaches do not make use of a distance sensor (they are therefore known as "passive" approaches), but rather of a module for estimating quality, which extracts a quality metric—typically sharpness—from the obtained image. This estimation is compared to a reference value in order to deliver an error signal; a closed-loop controller acts upon an actuator in such a way as to minimize this error signal. Among the advantages of this approach, mention may be made of the absence of an active distance sensor, and the fact that disturbances and drift are taken into account without the need for calibration. In contrast, if the performance of the system is to be robust in the face of uncertainties in optical module performance (for example linked to technological variability), the control law must be chosen wisely, this requiring a certain level of expertise on the part of the designer. Furthermore, speed is reduced with respect to open-loop systems.

There are a wide variety of closed-loop approaches.

One conventional solution consists in carrying out a search for a maximum sharpness (an indicator of the image quality) using a so-called "climbing" method on a sharpness curve. For this, the image sharpness estimator receives a matrix of signals from the image sensor and uses it to calculate a sharpness indicator "n" according to a chosen metric. Next (considering, for the sake of simplicity, the single case of a system with a variable focus lens), the value $y=\partial n/\partial f$ of the sharpness gradient is calculated with respect to the focal length of the lens f; this makes it possible to determine the direction of the control to be applied. An integral-type control law is subsequently used, this allowing the lens to be deformed in such a way as to approach the maximum of the sharpness. This solution has a certain number of drawbacks. First of all, the calculation of the sharpness gradient is, by nature, very sensitive to noise. Furthermore, the signal for controlling the actuator is typically quantized, implying that all of the focal lengths in a given continuous interval $[f_{min}, f_{max}]$ are not actually attainable, leading to a degradation of the focusing precision. Decreasing the quantization step size allows focusing precision to be improved, but at the cost of increasing convergence time and power consumption. Parasitic oscillations may also occur about the optimum sharpness value.

The paper by Jie He et al. "*Modified Fast Climbing Search Auto-focus Algorithm with Adaptive Step Size Searching Technique for Digital Camera*", IEEE Transaction on Consumer Electronics, 49(2): 257-262 (2003) describes a refinement of this approach, in which the quantization step size is chosen depending on the proximity to the maximum (larger far away from the maximum, and increasingly small as proximity thereto increases). This makes it possible, at least in principle, to improve response time and power consumption. However, reliably determining the proximity of the maximum is not simple: specifically, the sharpness gradient is generally low both close to the optimum focusing conditions and far away therefrom. In practice, the rules for readapting the gain are chosen assuming a priori knowledge of the behaviour of the optical module, whereas in cases of actual use, this behaviour is often different from that modelled—owing to, for example, technological variability and temperature drift—thereby leading to a loss of focusing performance.

Another possibility consists in using a PID (proportional-integral-derivative) controller with two additional degrees of freedom with respect to the purely integral control considered above. One advantage of this approach is that many proven methods for designing PID controllers are described in the literature. However, this type of control is worth considering only when the digital image sensor and the block for analyzing image sharpness operate at a speed comparable to or greater than that of the actuator of the lens ("slow lens"). Moreover, the model for which the PID controller has been setup does not allow the response time of the focusing system to be minimized because the model of the optical module changes depending on the scene in question. Furthermore, technological variability or even temperature drift implies that the actual module follows a model that is different to that used to set up the controller.

Yet another possibility consists in adopting a predictive approach, see, for example, the paper by L. I.-C. Chiu et al. "*An efficient auto focus method for digital still camera based on focus value curve prediction model*", Journal of Information Science and Engineering, 26(4): 1261-1272, (2010). In this approach, the sharpness as a function of the position of the lens given by a sum of bell curves is assumed to be mathematically modelled, the parameters of which must be identified. The presented results suggest that this method allows a very fast convergence to be obtained, at least in the presence of a single sharpness peak—this, typically, corresponding to the presence of a single object in the imaged scene. However, in the presence of a plurality of objects, the identification of the parameters of the model is a non-linear and, in general, non-convex problem, the computational complexity of which risks becoming prohibitive.

The invention aims to overcome, entirely or in part, at least some of the aforementioned drawbacks. More precisely, the invention aims to provide an automatic focusing method that is both robust and fast and that does not require the use of an active distance sensor. The invention aims in particular to provide such a method that is well suited to the case of a "fast lens", i.e. to a camera in which the response time of the actuator and of the optical module is less than the time required for the acquisition of the images and for the calculation of a sharpness metric.

SUMMARY OF THE INVENTION

One subject of the invention, allowing this aim to be achieved, is a method for automatically focusing a camera comprising an image sensor, at least one lens configured to project an image onto said sensor and an actuator configured to modify a focusing parameter of the lens, the method comprising:

a first phase comprising:
an open-loop control of said actuator, so that said focusing parameter successively takes a plurality of predefined values;
the acquisition of a plurality of images by means of said sensor, each corresponding to one said predefined value of the focusing parameter; and
the calculation of a sharpness indicator on the basis of each of said images;
and
a second phase of controlling, in a closed loop, said actuator so as to maximize said sharpness indicator;
said second closed-loop control phase being implemented by making use of a control law and starting conditions determined on the basis of the sharpness indicators calculated during said first phase.

Another subject of the invention is a system for automatically focusing a camera comprising:
an actuator configured to modify a focusing parameter of a lens of the camera; and
a processor configured to receive, as input, a signal representative of an image acquired by an image sensor of the camera and to produce, at its output, a signal for controlling said actuator;
characterized in that said processor is configured or programmed to implement such a method.

Yet another subject of the invention is a camera comprising an image sensor, at least one lens configured to project an image onto said sensor and such an automatic focusing system the actuator of which is configured to modify a focusing parameter of said lens and the processor of which is configured to receive, as input, a signal representative of an image acquired by said sensor.

BRIEF DESCRIPTION OF THE DRAWINGS

Other features, details and advantages of the invention will be brought to light upon reading the description given with reference to the appended drawings which are given by way of example and which show, respectively.

DETAILED DESCRIPTION

Figure 1:
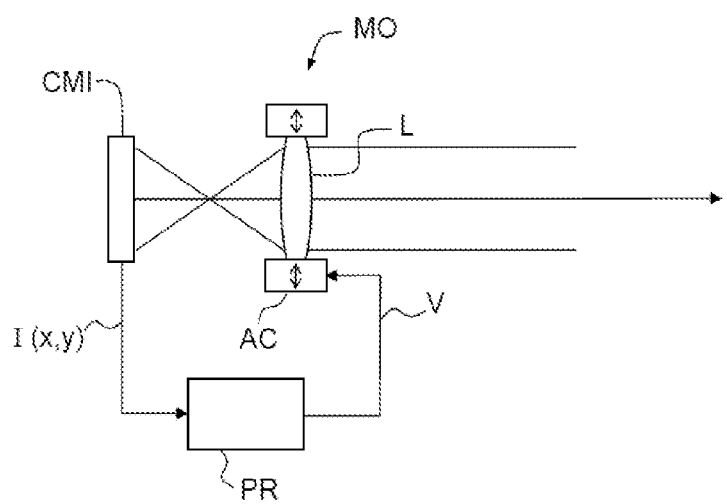
FIG. 1, the block diagram of a camera according to one embodiment of the invention.

FIG. 1 shows a simplified block diagram of a digital camera with closed-loop automatic focusing, able to be adapted to the implementation of the invention. This camera essentially comprises an optical module MO, a matrix image sensor CMI and a processor PR. As for the optical module, it comprises at least one lens L and an actuator AC that allows at least one optical parameter of the module to be modified. In the example of the figure, the lens L is deformable and the actuator AC allows the vergence thereof to be modified; in other embodiments, the actuator could move the lens along its focal axis with respect to the sensor CMI. The lens forms an image on the sensor CMI, which produces an electronic signal I(x,y), where x and y are discrete indices identifying the pixels of the sensor. This signal is delivered to the processor PR which uses it, among other things, to generate a signal V for controlling the actuator, in accordance with the closed-loop autofocus principle. The camera may be integrated in another device, such as a mobile phone.

The idea on which the invention is based consists in using an automatic focusing method comprising two phases: a first open-loop phase not using an active distance sensor, and a second closed-loop phase. The first phase consists in a summary exploration of a space of focusing configurations; typically, it is a question of trialling a series of predefined values of the vergence of the lens, the position thereof or any other parameter representative of the focusing conditions. An image is acquired for each of these focusing configurations, and its sharpness value is calculated by the processor. This makes it possible:

1) to determine a starting condition sufficiently close to the optimum sharpness;
2) to determine an optimum control law.

Figure 2:
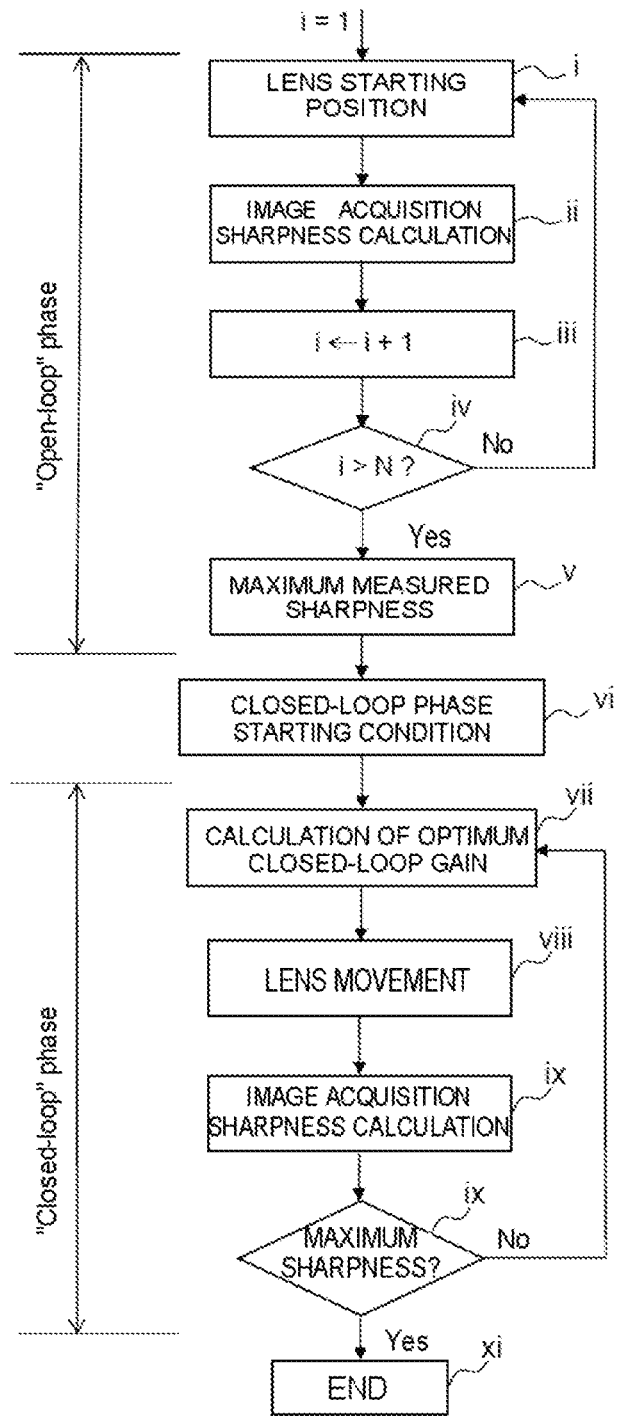
FIG. 2, a flow diagram of a method according to one embodiment of the invention.

FIG. 2 shows a flow diagram of a method implementing this principle. In the discussion of this flow diagram, the case will be considered in which focusing is achieved by moving the lens, but this is only a predefined example.

Step i consists in positioning the lens in a first predetermined position (or in adjusting its vergence to a first predetermined value). Next (ii), an image corresponding to this position of the lens is acquired and the sharpness value thereof is calculated. Multiple sharpness metrics that may be applied to the invention are described in the paper by S. Pertuz et al. "*Analysis of focus measure operators for shape-from-focus*" Pattern Recognition, 46(5): 1415-1432, 2013. Next (iii), a counter i, initially set at 1, is incremented, and these operations are iterated for as long as its value does not exceed a predefined maximum N (iv). Typically, the number of iterations is between 3 and 7, or even 10. At the end of this first open-loop phase, N sharpness measurements corresponding to as many different lens positions, have therefore been obtained. It is therefore possible to determine the maximum of the measured sharpness values (vi), thereby allowing a starting condition $V^{max}$, i.e. the value attributed to the signal for controlling the actuator at the start of the closed-loop control phase (vi), to be calculated.

Figure 4A:
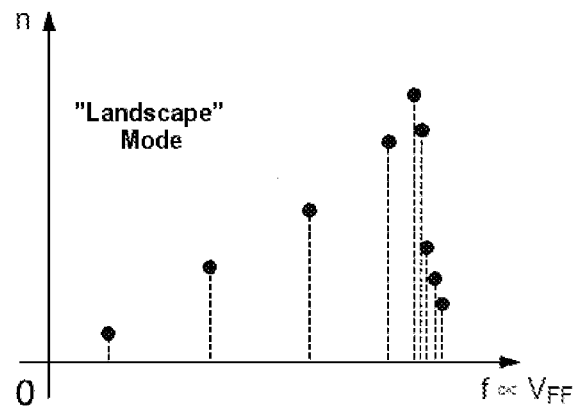
FIGS. 4a, 4b and 4c, graphs illustrating three possible embodiments of the first open-loop control phase.
Figure 4B:
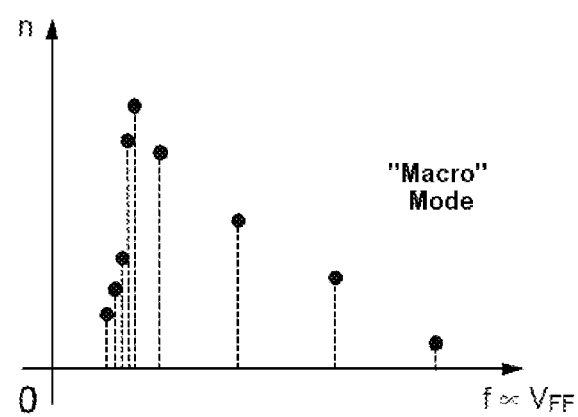
Figure 4C:
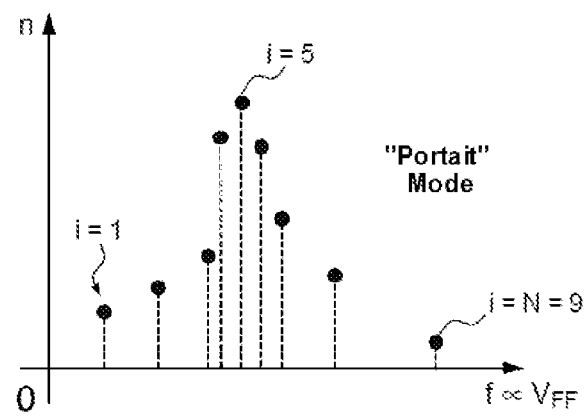

It is worth noting that, during the open-loop phase, the sampling of the space of focusing parameters is not necessarily uniform. By way of example, a still camera may be considered in which the user may select a "landscape" mode, a "macro" mode and a "portrait" mode. In "landscape" mode (cf. FIG. 4A), the region of low focal lengths "f" is very roughly sampled, and the majority of the predefined values tested are close to infinity, where, in all likelihood, the maximum sharpness n will be found. Stated otherwise, the rate of advance of the lens gradually decreases. In contrast in "macro" mode low focal lengths are preferentially sampled (FIG. 4B). In "portrait" mode (FIG. 4C) the majority of the sampled focal lengths have intermediate values. In FIGS. 4A-4C, the sharpness n may equally be expressed as a function of the focal length f or of the control signal $V_{FF}$ ("FF" for "feed-forward"), these two quantities being linked by a (not necessarily linear) relationship specific to the actuator. The expression "focusing parameter" will be used below to signify, either an optical parameter such as the vergence of a lens or its distance from the image sensor, or the corresponding value of the signal for controlling the actuator.

If, for example, the case in FIG. 4C is considered, it will be noted that 9 focal length values are sampled (N=9); they are considered to be sampled in order, from the lowest focal length (for i=1) to the highest (i=N=9). The maximum sharpness corresponds to the case i=5. In order to get there from the end condition i=N=9, it would be necessary to move the lens backwards (i.e. in a direction opposite to that of the movement carried out during the open-loop phase). However, some actuators exhibit hysteresis; it may therefore be preferable, from the point of view of precision, to bring the lens back to its starting position (i=1), which typically corresponds to an end stop, and to move it forward to the optimum position. This approach to reducing the influence of hysteresis is of interest only if the lens has a response time much shorter than the operating rate of the imager, as the time limitation will come from the time required to position the lens in a stable state (i.e. after the transitional states). Nowadays, camera imagers generally operate at a speed of 60 frames per second (fps), corresponding to an interval between image acquisitions that is equal to 17 ms.

Next begins the closed-loop control phase. Returning to FIG. 2, it may be seen that the first step of this second phase is the calculation of the "optimum" gain of the closed-loop control law (vi) on the basis of the "focusing parameter/image sharpness" pairs acquired beforehand. The implementation of this step according to one advantageous embodiment of the invention will be described in detail below with reference to FIG. 5. Next, the lens is moved (viii) depending on the gain calculated in the preceding step, an image is acquired and the corresponding sharpness is calculated (ix). If the maximum sharpness is reached (which is typically determined by verifying that the last movement was smaller than a threshold), the method is stopped; otherwise, a new iteration is started (x). It is important to note that, during iterations other than the first, the calculation of the gain (step vii) is performed while also taking into account the sharpness measurements carried out during the closed-loop phase.

Figure 3:
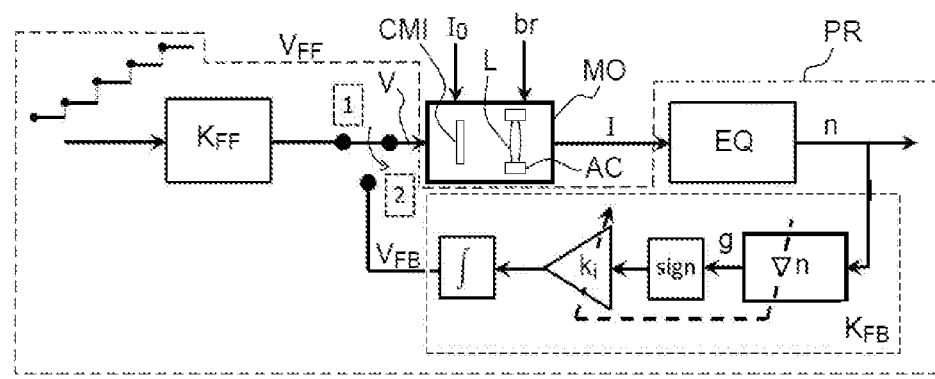
FIG. 3, a block diagram illustrating a control law according to one embodiment of the invention.

FIG. 3 illustrates a block diagram of an automatic focusing system implementing the method of FIG. 2. The assembly composed of the optical module and the image sensor receives, as input, a spatial light intensity distribution $I_0$, a noise br, and a control signal V that determines at least one focusing parameter; at its output it delivers an electronic signal I, representative of an image.

A switch makes it possible to choose between open-loop control (position 1) and closed-loop control (position 2). The open-loop controller corresponds to a static gain block $K_{FF}$ receiving, as input, a ladder signal, which allows the lens L of the optical module MO to be moved in a predetermined manner. The closed-loop controller is much more complex. It comprises a quality evaluation module EQ, which receives, as input, the signal I generated by the image sensor, and, at its output, delivers a sharpness measurement n. The closed-loop control block $K_{FB}$ first comprises a block for calculating the sharpness gradient $\nabla n$ (more precisely, the derivative of the sharpness with respect to the focusing parameter used for the control), a "sign" block for determining the sign of this gradient, a gain $k_i$ that changes from one iteration to another depending on the value of the gradient and an integrator.

In the figure, "$V_{FF}$" is the open-loop control signal, "$V_{FB}$" the closed-loop control signal and "V" the control signal actually applied to the actuator AC; V is equal to $V_{FF}$ or to $V_{FB}$ depending on the position of the switch. Typically, the processor PR, programmed in an appropriate manner, performs the functions of the closed-loop and open-loop controllers and of the switch: these elements therefore do not necessarily correspond to identifiable hardware elements: this is referred to as a software implementation. As a variant, the controllers may be implemented as hardware, using dedicated programmable logic circuits and/or integrated circuits. A hybrid software/hardware implementation is also possible.

The steps for calculating the closed-loop gain will now be described in detail with the aid of FIGS. 5a and 5b.

One advantageous aspect of the invention is the use of a quadratic approximation to locally model the sharpness characteristic in the vicinity of the maximum, this allowing the calculations to be performed during the closed-loop phase to be simplified most considerably.

The sharpness n is then modelled by:

$$n(V)=a\cdot V^2+b\cdot V+c \quad (1)$$

where a, b, c are the parameters of the model. It will be assumed below—although this in no way constitutes a limitation—that the control signal V (or $V_{FB}$, as it is the closed-loop control phase that is under consideration) represents a voltage applied to an AC actuator that modifies the vergence or the position of the lens L.

This hypothesis as to the shape of the sharpness curve in the vicinity of the maximum is not been rigorously verified in the general case. Nonetheless, it makes it possible to obtain an effective and easy-to-implement method allowing the maximum sharpness to be rapidly converged upon once the control loop is closed. Specifically, the parameters a, b and c of the quadratic model of the sharpness curve may be obtained analytically from three sharpness measuring points acquired during the open-loop phase.

As a variant, it is possible to choose a more complex model, but, taking account of the limited number of measuring points obtained in the open-loop phase, this runs the risk of over-parameterization. In order to limit this risk, it is possible, by making use of all of the sharpness measurements acquired in the open-loop phase, to determine a cubic spline type model (which may or may not be constrained). However, this alternative embodiment entails an additional computational cost. The retained quadratic model also has the appeal of being determinable analytically from the judicious choice of three measuring points obtained in the open-loop phase. Alternatively, and in particular if more measurements are taken during the open-loop phase, it is possible to make use of a least squares-type method to determine the model of the sharpness curve, although this is computationally more costly.

Another advantageous aspect of the invention is the use of an adaptive closed-loop control law in which the gain of the integrator of the closed-loop controller (or corrector) and, consequently, the step size of the actuator, vary depending on the proximity to the maximum sharpness. More precisely, in one embodiment of the invention, the information measured in the closed-loop phase is used to initialize the gain of the controller. This information is found in the gradient of the sharpness curve, the latter being modelled by the quadratic function of equation 1. This gradient is given by:

$$\frac{\partial n(V)}{\partial V} = 2aV + b \quad (2)$$

It is apparent that there is only one voltage V* corresponding to a zero gradient:

$$V^* = -\frac{b}{2a} \quad (3)$$

Applying this voltage to the actuator allows it to be moved to the theoretical maximum sharpness, assuming a quadratic sharpness variation.

In practice, the parameters a and b of the quadratic model are unknown; in contrast, a few measuring points of the sharpness acquired for predefined voltages (open-loop phase) are available. Thus, in order to find the parameters a and b, it is possible to use a standard least squares type identification method. This method entails a non-negligible computational cost. However, the aim is to roughly determine the voltage range in which the voltage corresponding to the actual maximum sharpness is located. For this reason, as a first approximation, it is proposed to dispense with a least squares type of technique for identifying parameters. For this, three measuring points of the sharpness obtained in the open-loop phase, $n_{max}$, $n_{left}$, $n_{right}$, are retained, these points respectively being the open-loop measuring point having maximum sharpness, the point directly to the left and the point directly to the right (see the top part of FIG. 5a, in which the voltage V* calculated by equation 3 is denoted by $V_0^*$ for reasons that will be explained below). These three points are enough to define a parabola in a unique manner. This approach is very simple, but it does not allow measurement noise to be filtered out.

It is known that the abscissa for which the derivative of a parabola is equal to zero is located at the overall maximum (minimum). Knowing that the function that describes the sharpness is upwardly convex, then the term "a" in equation 1 is smaller than zero. In this case, it is known that the zero gradient corresponds to the overall maximum because the second derivative is negative. H is questionable whether it would be better to use the sharpness gradient ($\nabla n$, in FIGS. 5a and 5b) instead of measuring the sharpness (n) directly. The problem with measuring the sharpness directly is that the absolute values are completely unpredictable and necessarily depend on the environment of the shot, whereas the absolute values of the gradient always converge towards zero when the voltage approaches the voltage corresponding to maximum sharpness. This advantage opens up the possibility of applying systematic determination methods for closed-loop control.

The first problem to be solved to implement the closed-loop control therefore consists in determining the voltage corresponding to the maximum sharpness, given three points measuring absolute sharpness, and under the assumption that the sharpness, curve as a function of the voltage applied to the actuator is quadratic.

This problem may be resolved by turning to Lagrange's theorem on the mean of a function: namely a continuous function $f \in \mathbb{R}$ defined over the interval $[x_1, x_2] \in \mathbb{R}$; there then exists a point $x^* \in [x_1, x_2]$ such that:

$$\left.\frac{df(x)}{dx}\right|_{x^*} = \frac{f(x_2) - f(x_1)}{x_2 - x_1} \quad (4)$$

More precisely, the following corollary of this theorem is employed: let $f(x) = ax^2 + bx + c$, where $x, a, b, c \in \mathbb{R}$; then $$\left.\frac{df(x)}{dx}\right|_{x^*} = \frac{f(x_2) - f(x_1)}{x_2 - x_1} \quad (5)$$

if and only if $$x^* = \frac{x_2 + x_1}{2} \quad (5')$$

In the context of finding the zero gradient, this corollary is very useful as it makes it possible to obtain the voltages corresponding to levels of the gradients calculated from the sharpness measurement under the quadratic assumption. The three points measuring sharpness transform into two gradient points:

$$G_{left} = \left.\frac{\partial n}{\partial V}\right|_{V=V_{grad}^{left}} = \frac{n^{max} - n^{left}}{V^{max} - V^{left}} \quad (6)$$

$$G_{right} = \left.\frac{\partial n}{\partial V}\right|_{V=V_{grad}^{right}} = \frac{n^{right} - n^{max}}{V^{right} - V^{max}}$$

where the voltages $V_{grad}^{left}$ and $V_{grad}^{right}$ are determined by applying the corollary:

$$V_{grad}^{left} = \frac{V^{max} + V^{left}}{2} \quad (6')$$

$$V_{grad}^{right} = \frac{V^{max} + V^{right}}{2}$$

The estimated "zero" gradient is therefore located on a straight line defined by the voltages calculated to generate the gradients of the measurement. This straight line is defined by:

$$\frac{\frac{\partial n}{\partial V} - \frac{\partial n(V_{grad}^{left})}{\partial V}}{\frac{\partial n(V_{grad}^{right})}{\partial V} - \frac{\partial n(V_{grad}^{left})}{\partial V}} = \frac{V - V_{grad}^{left}}{V_{grad}^{right} - V_{grad}^{left}} \quad (7)$$

In order to simplify the notation, $$\mathcal{G} = \frac{\partial n(V)}{\partial V}$$

is posited and the following is obtained:

$$\frac{\mathcal{G} - \mathcal{G}_{left}}{\mathcal{G}_{right} - \mathcal{G}_{left}} = \frac{V - V_{grad}^{left}}{V_{grad}^{right} - V_{grad}^{left}} \quad (7')$$

It follows that the voltage V* corresponding to this zero gradient (and therefore to the estimated maximum sharpness) is given by:

$$V^* = V_{grad}^{left} - \frac{\mathcal{G}_{left}}{\mathcal{G}_{right} - \mathcal{G}_{left}} (V_{grad}^{right} - V_{grad}^{left}) \quad (8)$$

By eliminating intermediate variables, the following is obtained:

$$V^* = \frac{1}{2}\left[V^{max} + V^{left} - \frac{(n^{max} - n^{left})(V^{right} - V^{left})(V^{right} - V^{max})}{n^{left}(V^{right} - V^{max}) + n^{max}(V^{left} - V^{right}) + n^{right}(V^{max} - V^{left})}\right] \quad (9)$$

Figure 5A:
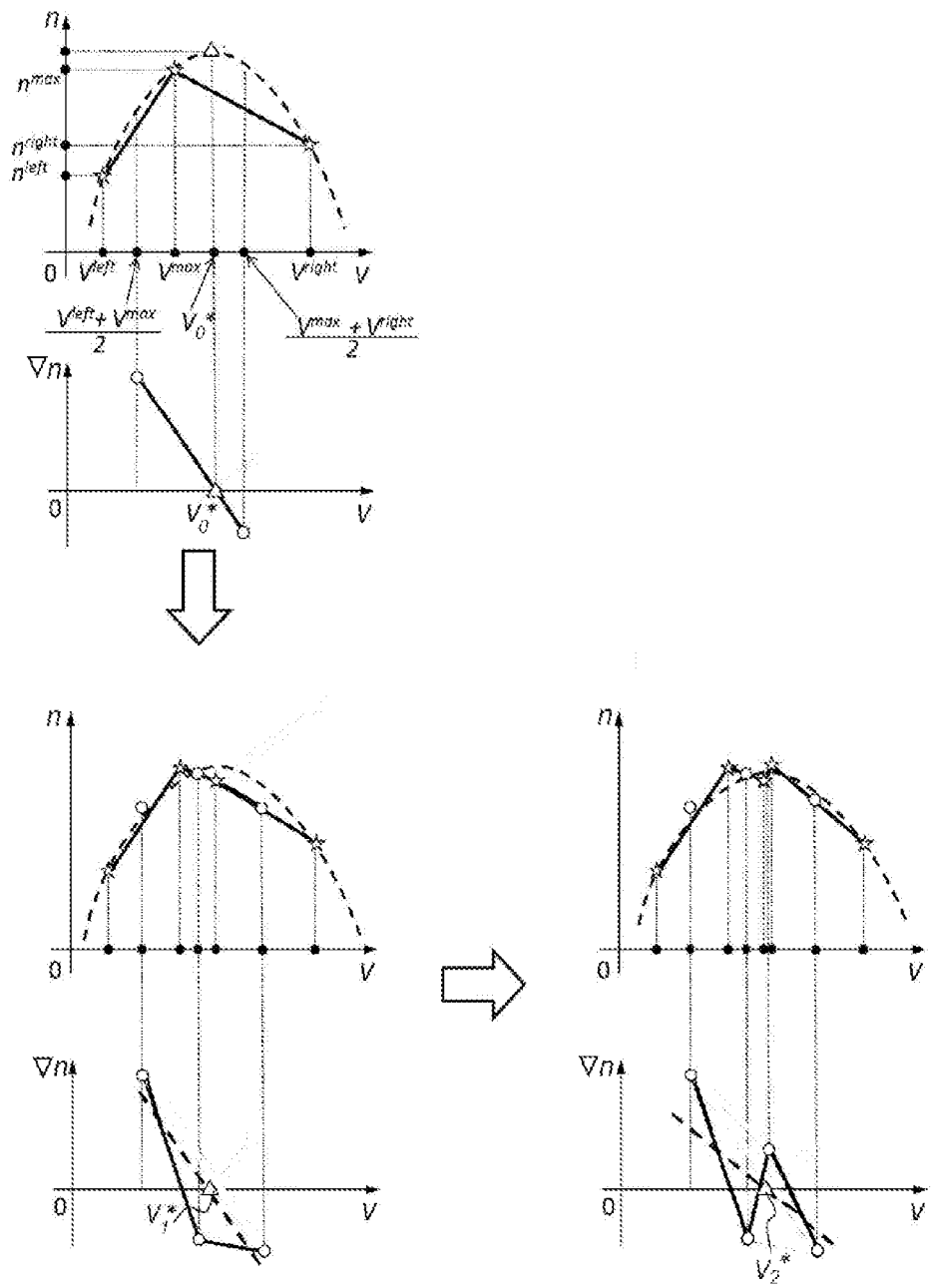
FIGS. 5a and 5b, illustrations of the implementation of the second closed-loop control phase according to two alternative embodiments of the invention.

This is illustrated by the graphs in the top part of FIG. 5a, in which the value V* given by the equations (8) and (9) is denoted by $V_0^*$.

Returning to FIG. 3, it will be recalled that the closed-loop control block $K_{FB}$ comprises an integrator (symbol "∫") and a variable gain $k_i$, adjusted at each instant "i" of sampling. The control law implemented by the block $K_{FB}$ may therefore be written:

$$K_{FB}: V_{FB} = k_i^{int} \sum_{l=0}^{i} \text{sign}(\mathcal{G}_l) \Delta t$$

where $k_i^{int}$ is the value of the adjusted gain at the instant i, $G_l$ is the gradient calculated from two neighbouring voltages at the input of the optical module and corresponding sharpness values n and Δt is the temporal step size sampling. As operation is in discrete time, the integration is in fact a sum weighted by Δt.

As the quadratic assumption is not always realistic, it is proposed, in accordance with one advantageous embodiment of the invention, to use a gain $k_i^{int}$ that is modified at each instant of sampling (i.e. each time the sharpness indicator is calculated in closed-loop operation) while taking into account all of the measurements carried out over the course of the closed-loop phase, in which the sharpness gradient may be considered to be linear. This approach is radically different from the adaptive control methods known from the prior art, as the gain $k_i^{int}$ is chosen in such a way as to cancel out the gradient calculated from direct measurements, under the assumption of a quadratic sharpness variation.

Thus, the adaptive gain $k_i^{int}$ for closed-loop operation is calculated using the approach of searching for the zero gradient using the approach presented in FIG. 5a. It will be noted that in this figure, the measured sharpness values are represented by stars, whereas the calculated values of the gradients and the estimated sharpness values corresponding to these gradients are represented by circles, and that a triangle represents the estimation of the voltage value corresponding to the maximum sharpness.

The starting condition of the closed-loop phase is given by the voltage $V_{max}$ tested in the open-loop phase, that maximizes the sharpness. Next, applying equation 9 allows the voltage value $V_0^*=V^*$, which corresponds to a zero sharpness gradient, and therefore to the theoretical maximum sharpness under the quadratic assumption, to be found.

Thus, the optimum integrator gain, which cancels out the theoretical gradient for the first step of advance in the closed-loop phase, is defined by:

$$k_0^{int} = |V_0^* - V_{FF}^{end}| \quad (10)$$

where $V_0^*$ is given by $$V_0^* = \frac{1}{2}\left[V^{max} + V^{left} - \frac{(n^{max} - n^{left})(V^{right} - V^{left})(V^{right} - V^{max})}{n^{left}(V^{right} - V^{max}) + n^{max}(V^{left} - V^{right}) + n^{right}(V^{max} - V^{left})}\right]$$

(cf. equation 9), whereas $V_{FF}^{end}$ is the control voltage at the end of the open-loop phase. If the quadratic assumption were rigorously verified, and if the sharpness measurements were not affected by noise, then the method according to the invention could stop here; however, this is generally not the case.

By applying the voltage $V_0^*$ to the actuator, it is possible to acquire a new sharpness value. Four sharpness measurements are thus available, allowing three gradient values and the corresponding voltages given by the corollary of Lagrange's theorem (equation 5') to be calculated; these gradient values are those determined previously ($\mathcal{G}_{left}$, $\mathcal{G}_{right}$), plus a new value denoted by $\mathcal{G}_2$. In theory, these three gradient points should be located on the straight line given by equation 7, but that is not the case in practice (as the quadratic assumption is only an approximation and the measurements are affected by noise). As shown by the graphs in the bottom-right part of FIG. 5a, three unaligned gradient points make it possible to identify three straight lines the mean of which (shown by the dotted line) is chosen as the "straight line of the gradients" for the $2^e$ iteration of the closed-loop phase. $V_1^*$ denotes the voltage value at which this mean straight line intercepts the axis of the abscissae: this constitutes a new approximation of the zero-sharpness gradient point (and hence maximum sharpness). The new value of the gain of the controller is given by:

$$k_1^{int} = |V_1^* - V_0^*| \tag{10'}$$

By applying the voltage $V_1^*$ to the actuator, it is possible to acquire a new sharpness value. Five sharpness measurements are thus available, allowing four gradient values and the corresponding voltages given by the corollary of Lagrange's theorem (equation 5') to be calculated. As in the preceding iteration, these four points $(V, \nabla n)$ are not aligned, and allow six different gradient straight lines to be identified, the mean of which is taken in order to determine a new approximation of the zero-sharpness gradient point (and hence maximum sharpness), denoted by $V_3^*$ and so on. The bottom-right part of FIG. 5a illustrates the situation after the third iteration.

Generally speaking, the gain on the $i^{th}$ iteration (where $i \geq 1$) is given by:

$$k_i^{int} = |V_i^* - V_{i-1}^*| \tag{11}$$

where $V_i^*$ is the voltage value V that cancels out the mean gradient $\hat{\mathcal{G}}$.

It is possible to give a general analytic expression for the straight line of the mean gradient $\hat{\mathcal{G}}$ for each iteration of the closed-loop phase, and hence also for $V_i^*$ for all cases where $i \geq 0$. To do this, it is first necessary to define the vector $V_I = (V_0, V_1, \ldots, V_i)$, the elements $V_l$ of which are the values of the control voltage calculated during the preceding iterations of the closed-loop phase, and the "starting" voltages $V^{max}$, $V^{left}$ and $V^{right}$ obtained during the open-loop phase; it will be understood that the size of the vector $V_I$ increases throughout the closed-loop phase. Thus, during the first iteration (i=1): $(V_0 = V^{left}; V_1 = V^{max}; V_2 = V_0^*; V_3 = V^{right})$; these data make it possible to calculate $V_1^*$, which will be integrated into the vector $V_I$ (its elements being reorganized in order to retain the ascending order), and so on.

Thus $$\hat{\mathcal{G}} = \frac{1}{i+1} \sum_{l=0}^{i} \left( \mathcal{G}_l - V_l \frac{\mathcal{G}_{l+1} - \mathcal{G}_l}{V_{l+1} - V_l} + V \frac{\mathcal{G}_{l+1} - \mathcal{G}_l}{V_{l+1} - V_l} \right) \tag{12}$$

where $$\mathcal{G}_l = \frac{n_{l+1} - n_l}{V_{l+1} - V_l}$$

in which $n_l = n(V_l)$.

Thus, the averaged slopes are those of the straight lines that link measurements of sharpness corresponding to adjacent voltage values. This may be seen in the bottom part of FIG. 5a.

The sum that appears in equation 12 carries out a low-pass filtering which reduces the influence of the noise affecting the sharpness measurements.

If the expression for the gradient mean straight line is written as:

$$\hat{\mathcal{G}} = \hat{a}_i V + \hat{b}_i;$$

then the mean slope $\hat{a}_i$ is given by:

$$\hat{a}_i = \frac{2}{i+1} \sum_{l=0}^{i} \frac{\mathcal{G}_{l+1} - \mathcal{G}_l}{V_{l+1} - V_l} = \frac{2}{i+1} \sum_{l=0}^{i} \frac{(V_{l+1} - V_l)(n_{l+2} - n_{l+1})}{(V_{l+2} - V_{l+1})(V_{l+1} - V_l)} \tag{13}$$

and the y-intercept $\hat{b}_i$ by:

$$\hat{b}_i = \frac{1}{i+1} \sum_{l=0}^{i} \left( \mathcal{G}_l - V_l \frac{\mathcal{G}_{l+1} - \mathcal{G}_l}{V_{l+1} - V_l} \right) \tag{14}$$

$$= \frac{1}{i+1} \sum_{l=0}^{i} \left( \frac{n_{l+1} - n_l}{V_{l+1} - V_l} - (V_l + V_{l+1}) \frac{(V_{l+1} - V_l)(n_{l+2} - n_{l+1}) - (V_{l+2} - V_{l+1})(n_{l+1} - n_l)}{(V_{l+2} - V_{l+1})(V_{l+1} - V_l)(V_{l+2} - V_l)} \right)$$

and $$V_i^* = -\frac{\hat{b}_i}{\hat{a}_i} \tag{15}$$

Equation 15, and equations 13 and 14, makes it possible to calculate the values of $V_i^*$ for all cases where $i \geq 0$; specifically, equation 9 is obtained as a special case of equation 15 for i=0.

It is worth noting that in general the mean gradient straight line (equations 12 to 14) does not coincide exactly with the linear approximation of the gradient in the sense of the least squares method. Nevertheless, it has empirically been found that the greater the number of measurements, the closer the mean straight line gets to that calculated by the least squares method, thereby justifying the proposed method.

In order to reduce the influence of the small number of measurements on the proximity of the mean straight line to the linear estimation of the conventional least squares type, one alternative embodiment proposes the use of the median straight line, the slope of which may be estimated using the following equation:

$$\hat{a}_i = \frac{1}{M} \sum_{(i,j) \in \Omega} \frac{\mathcal{G}_i - \mathcal{G}_j}{V_i - V_j} \tag{16}$$

and the median bias by $$\hat{b}_i = \frac{1}{N-1} \sum_{l=1}^{N-1} (\mathcal{G}_l - \hat{a} V_l). \tag{16'}$$

M being the number of lines connecting N points in an "each to every other" manner defined by M=i(i−1)/2 and Ω is the set of all of the non-repeated pairs of indices i and j.

The control may be considered as having reached the point of optimum functioning (i.e. the optimum focus where reached) in the case the increment of the voltage V* is negligible from one instant of sampling to another, or else this increment is smaller than the discretization used for the supply voltages of the lens actuator.

It is now necessary to consider two cases in which the implementation of the invention may prove to be problematic.

The first—seemingly favourable—is that in which the voltage corresponding to the maximum sharpness measured during the open-loop phase, $V^{max}$, is close to (or even identical to, taking account of the fact that the voltages are discretized) that calculated during the first application of the quadratic model, $V_0^*$. Since the behaviour of the sharpness curve in real cases is highly sensitive to noise, the calculated gradient may be heavily disrupted and the position of the zero gradient sought may be heavily skewed. One possible solution in order to overcome this problem is to apply a control $V_0+\Delta V$ for the initialization of the closed loop, where $\Delta V$ would be a minimum applicable voltage to the left or right of the voltage $V_0^*=V^{max}$. Stated otherwise, if the calculated voltage $V_0^*$ proves to be too close to $V^{max}$, then it is changed slightly. The sign of $\Delta V$ is defined as:

$$\text{sign}(\Delta V) = \text{sign}(V^{max} - V_0^*).$$

In the event that the quadratic assumption for the sharpness is confirmed, i.e. if the sharpness measured for a control voltage $V_0^*+\Delta V$ is sufficiently close to that measured in relation to $V_0^*$, the closed-loop control phase is stopped. Otherwise, the previously described iterative process is applied in order to find the voltage that corresponds to a sharpness gradient of (approximately) zero.

The second case is that in which the quadratic assumption is not verified, even in an approximative manner. This may be the case not only because of a particular configuration of the scene or of the optical module, but also when objects present in the area of interest are moving. In this case, the variation of the sharpness as a function of the voltage applied to the actuator, modelled by a parabola (quadratic curve), does not make it possible to converge towards the maximum sharpness in an efficient manner, as the choice of the gain in the closed-loop phase is made so that the peak of mean sharpness is moved towards, which implies a weak bias (movement) of the parabola for each measurement. This implies that the focal power that will ultimately be chosen for the focus will not be that which maximizes the sharpness.

In order to avoid this situation, it is suggested that the closed-loop gain be chosen as a moving average, i.e. to take into consideration only the L last measurements that were carried out during the closed-loop phase. This approach makes it possible to achieve a low-pass filtering effect on the modification of the voltage $V_i^*$ from one instant to another. The measurements that were carried out outside the preceding L instants are not taken into account for the calculation of the gain $k_i^{int}$. The calculation of the gain is therefore performed in the following manner (for the embodiment using one mean straight line for the gradients, cf. FIG. 5a and equations 13 to 15):

$$\hat{a}_i = \frac{2}{L+1} \sum_{l=0}^{L} \frac{\mathcal{G}_{i-l+1} - \mathcal{G}_{i-l}}{V_{i-l+1} - V_{i-l}} =$$

$$= \frac{2}{L+1} \sum_{l=0}^{L} \frac{(V_{i-l+1} - V_{i-l})(n_{i-l+2} - n_{i-l+1}) - (V_{i-l+2} - V_{i-l+1})(n_{i-l+1} - n_{i-l})}{(V_{i-l+2} - V_{i-l+1})(V_{i-l+1} - V_{i-l})(V_{i-l+2} - V_{i-l})}$$

$$\hat{b}_i = \frac{1}{L+1} \sum_{l=0}^{L} \left( \mathcal{G}_{i-l} - V_{i-l} \frac{\mathcal{G}_{i-l+1} - \mathcal{G}_{i-l}}{V_{i-l+1} - V_{i-l}} \right) =$$

$$= \frac{1}{L+1} \sum_{l=0}^{L} \left( \frac{n_{i-l+1} - n_{i-l}}{V_{i-l+1} - V_{i-l}} - (V_{i-l} + V_{i-l+1}) \right.$$

$$\left. \frac{(V_{i-l+1} - V_{i-l})(n_{i-l+2} - n_{i-l+1}) - (V_{i-l+2} - V_{i-l+1})(n_{i-l+1} - n_{i-l})}{(V_{i-l+2} - V_{i-l+1})(V_{i-l+1} - V_{i-l})(V_{i-l+2} - V_{i-l})} \right)$$

$$V_i^* = -\frac{\hat{b}_i}{\hat{a}_i}$$

where $1 < L < i$ defines the size of the moving window in terms of number of samples. The choice of L makes it possible to impose a bandwidth of greater or lesser size (and hence to modulate the effect of the low-pass filtering) depending on the optical module used (noise level of the image sensor, optical characteristics of the lenses). The use of this improvement in the choice of the closed-loop gain allows the method to be made more robust with respect to the behaviour of the sharpness when the quadratic assumption is not satisfied.

It may be noted that equations 13 to 15 may be considered to be a special case of equations 17 to 19, corresponding to the case L=i.

Figure 5B:
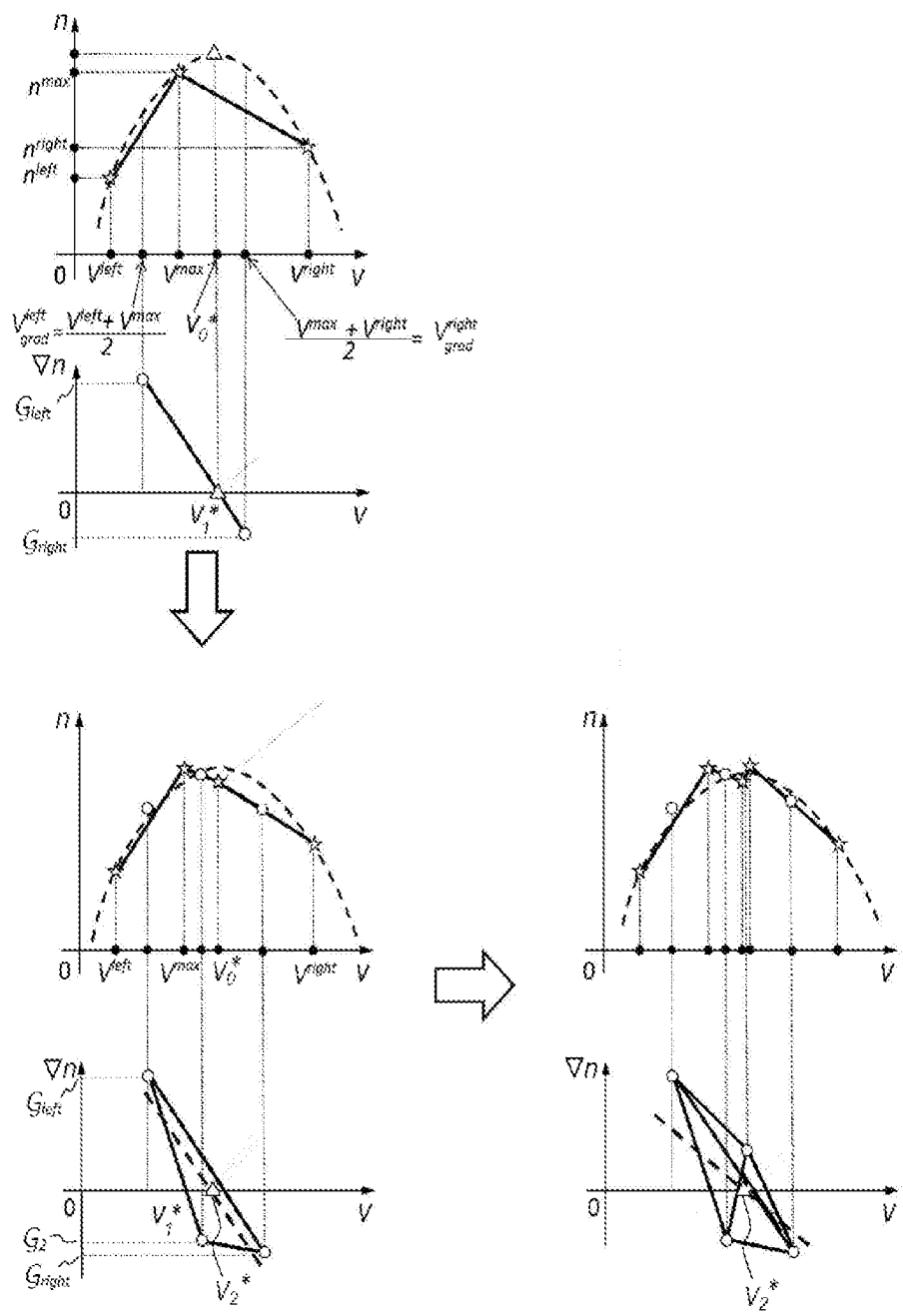

The use of a moving window is also possible for the embodiment using a median straight line for the gradients, cf. FIG. 5b and equations 16, 16'. In this case:

$$\hat{a}_i = \frac{1}{M} \sum_{(i,j) \in \Omega} \frac{\mathcal{G}_i - \mathcal{G}_j}{V_i - V_j} \qquad (20)$$

$$\hat{b}_i = \frac{1}{L-1} \sum_{l=1}^{L-1} (\mathcal{G}_l - \hat{a} V_l) \qquad (20')$$

Ω henceforth being defined as the set of all the non-repeated pairs of indices, while considering only the L last indices (indices between "i−L" and "i" for i>L, and all of the indices for i≤L).

The technical result of the invention will now be illustrated with the aid of FIGS. 6a to 8b.

Figure 6A:
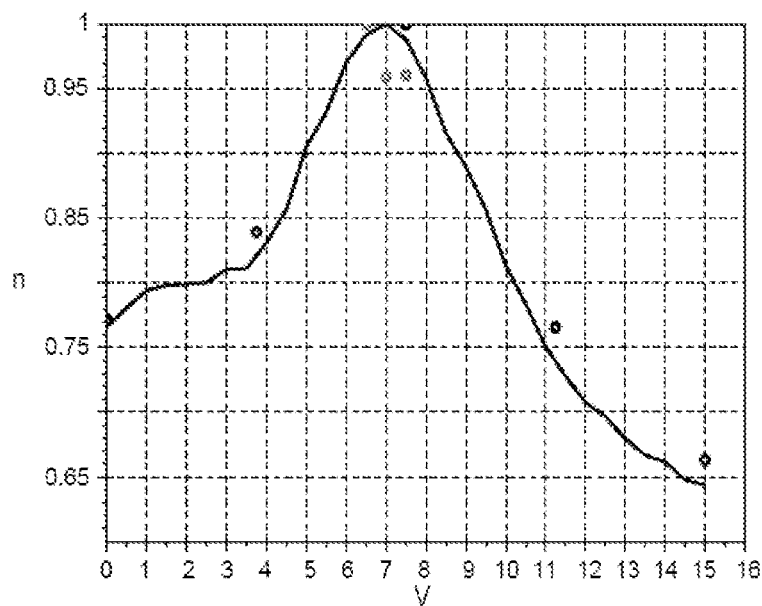
FIGS. 6a, 6b, 7a, 7b, 8a and 8b, graphs illustrating the technical result of the invention.
Figure 6B:
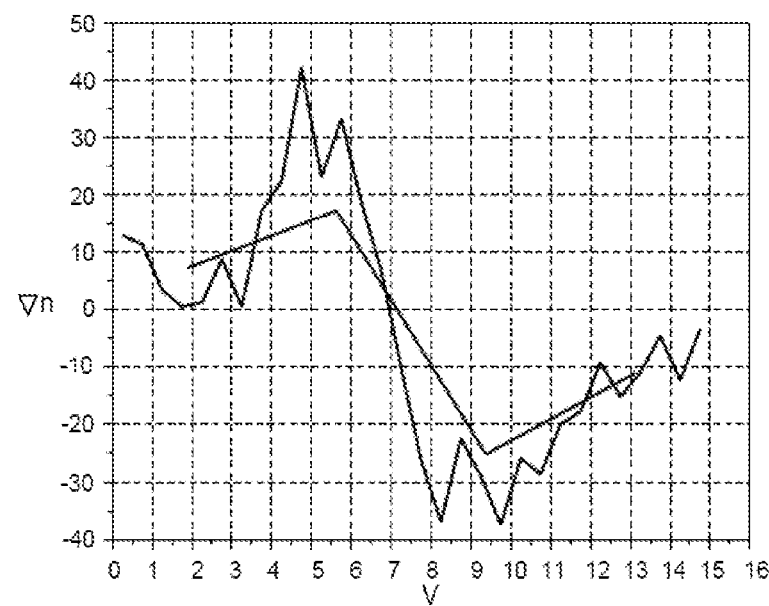

FIG. 6a shows the sharpness curve (relative sharpness, normalized to 1, as a function of the analogue control voltage of the actuator) of a camera, measured by moving the lens at a very fine rate of advance. The black dots correspond to the acquisitions carried out during the open-loop control phase and the grey dots to the various iterations of the closed-loop phase. Due to noise, these dots are not located exactly on the curve. FIG. 6b shows the gradient of the sharpness, obtained by taking the derivative of the sharpness curve (continuous curve) and calculated during the closed-loop phase on the basis of the quadratic assumption (broken line). It will be noted that even though the approximation of the gradient is relatively rough, the estimation of the voltage that cancels out ∇n is remarkably good.

Figure 7A:
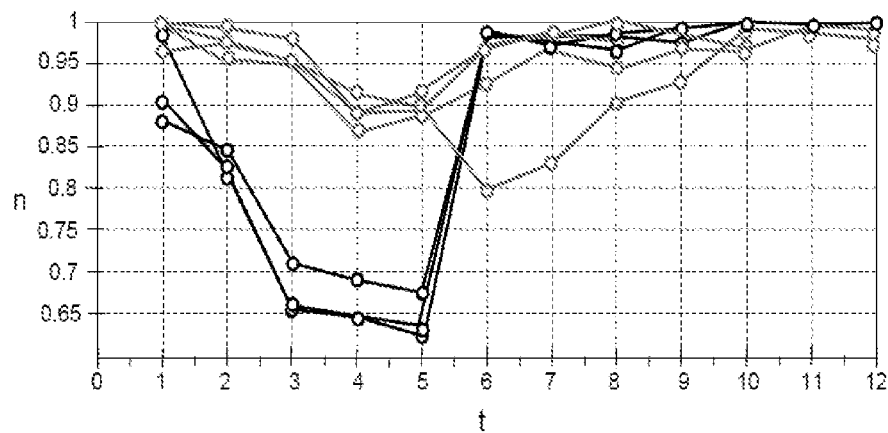
Figure 7B:
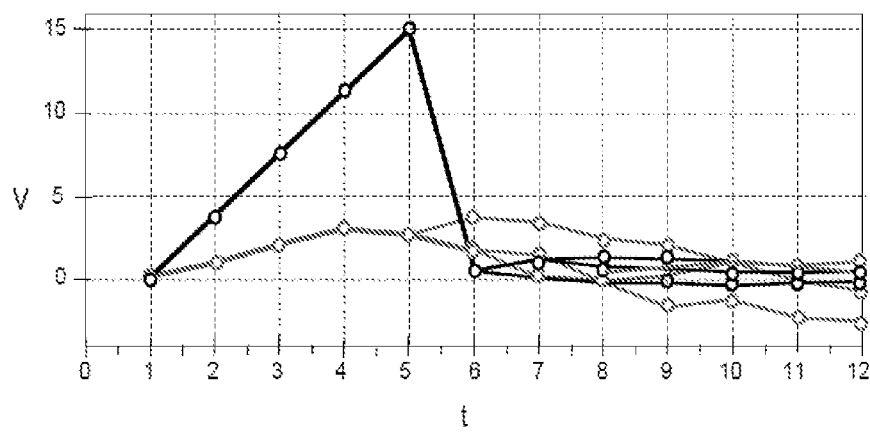

FIG. 7a shows how the sharpness of an image varies over time (the edge of a door at a distance of 3.5 m from the lens of the camera) during the focusing method of the invention (black lines) and a method known from the prior art (grey lines) known as binary search, in which the rate of advance is divided by two each time the sharpness peak is exceeded: see N. Kehtarnavaz and H.-J. Oh "*Development and real-time implementation of a rule-based auto-focus algorithm*" Real-Time Imaging, 9(3): 197-203, 2003. FIG. 7b shows the variation of the analogue control voltage of the actuator for these two cases in point. It may be seen that, in the case of the method according to the invention, the 5 first clock ticks correspond to the open-loop phase, over the course of which the lens moves in one direction. At the time t=6, the lens is positioned at the "provisional" maximum identified during the open-loop phase; 6 closed-loop iterations follow. Focusing was repeated multiple times with the two methods; a lesser degree of variability may be noted in the case of the invention, which translates into a decreased sensitivity to noise.

Figure 8A:
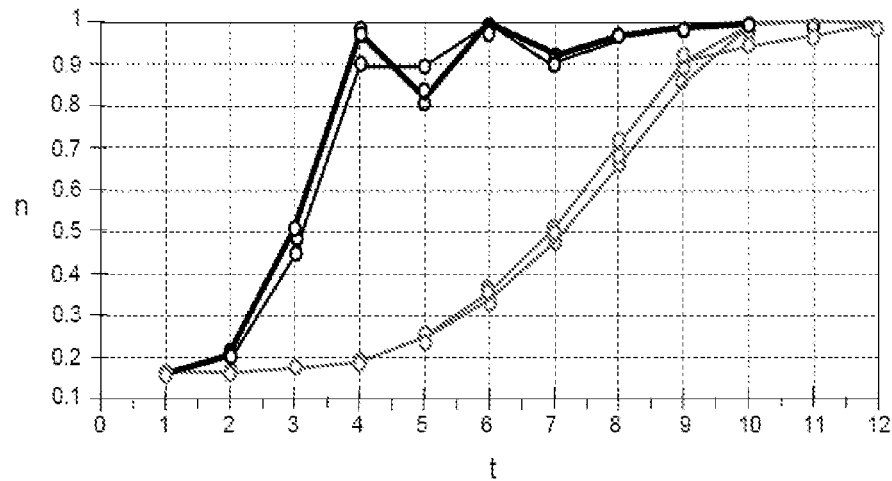
Figure 8B:
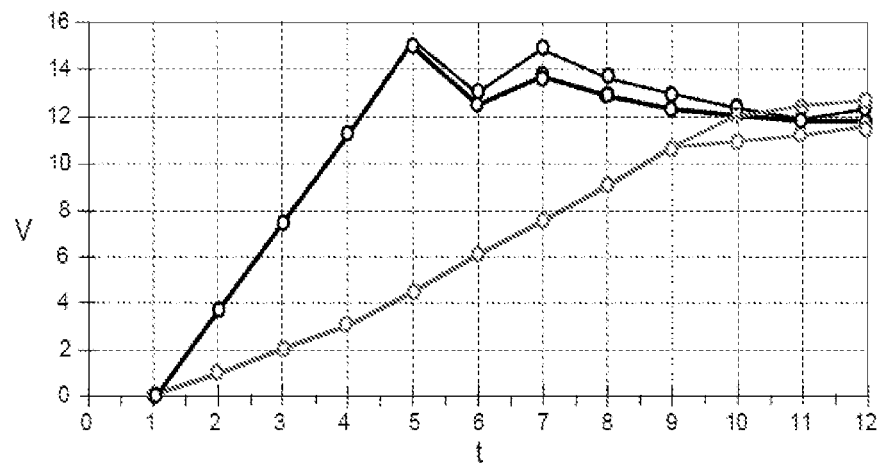

FIGS. 8a and 8b correspond to the case where the imaged object is a test card located 5 m away from the lens. In this case it may be noted that the method of the invention leads to a much quicker convergence than that known from the prior art (binary search, as in the case of FIGS. 7a, 7b).

In order to produce FIGS. 7a to 8b, a sharpness measurement based on the Haar transform and on the concept of local contrast was used. See, for example, the paper by M. Trivedi, A. Jaiswal and V. Bhateja "*A no-reference image quality index for contrast and sharpness measurement*", 3rd International Advance Computing Conference (IACC), 2013 IEEE, pages 1234-1239, February 2013.

The invention claimed is:

1. A method for automatically focusing a camera having an image sensor, at least one lens configured to project an image onto said image sensor and an actuator configured to modify a focusing parameter of the at least one lens, the method comprising:
    a first phase comprising:
        performing an open-loop control of said actuator, such that said focusing parameter successively takes a plurality of predefined values;
        acquiring a plurality of images by means of said sensor, each corresponding to one said predefined value of the focusing parameter; and
        calculating a plurality of sharpness indicators respectively on the basis of each of said images; and
    a second phase of controlling, in a closed loop, said actuator so as to maximize each of said plurality of sharpness indicators,
    said second closed-loop control phase being implemented by making use of both a control law and starting conditions determined on the basis of the plurality of sharpness indicators calculated during said first phase.

2. The method of claim 1, wherein said second phase is initialized at a value of the focusing parameter that corresponds to a highest value of a sharpness indicator calculated during said first phase.

3. The method of claim 1, wherein said second phase of controlling is performed using a control law having an adaptive gain.

4. The method of claim 3, wherein said second phase of controlling is performed by carrying out an iterative maximization of the sharpness indicators based on an estimated quadratic relationship linking said sharpness indicators and said focusing parameter.

5. The method of claim 4, wherein said second phase of controlling comprises, in each iteration, an updating of said estimated quadratic relationship in order to account for a sharpness indicator value determined during a preceding iteration.

6. The method of claim 5, wherein said second phase of controlling comprises the following steps:
    a) determining, from among predefined values of the focusing parameter that are used during said first phase, one that corresponds to the highest value of the sharpness indicator calculated during said first phase, denoted by $V^{max}$, one immediately above, denoted by $V^{right}$, and one immediately below, denoted by $V^{left}$;
    b) calculating a value of the focusing parameter that maximizes a quadratic relationship linking said sharpness indicator and said focusing parameter, estimated on the basis of the previously determined values of the focusing parameter and the corresponding values of the sharpness indicator;
    c) controlling said actuator so that the focusing parameter takes the value calculated during the preceding step;
    d) acquiring, by means of said image sensor, an image corresponding to said value of the focusing parameter from step b) and calculating a sharpness indicator for said image; and
    e) repeating steps b), c), and d) in an iterative manner until a stopping condition is satisfied.

7. The method of claim 6, wherein the calculating of step b) is carried out through an analytic formula.

8. The method of claim 7, wherein, during said step b), said value of the focusing parameter, which value is denoted by $V_i^*$, is calculated by applying the formulae:

$$\hat{a}_i = \frac{2}{L+1} \sum_{l=0}^{L} \frac{(V_{i-l+1} - V_{i-l})(n_{i-l+2} - n_{i-l+1}) - (V_{i-l+2} - V_{i-l+1})(n_{i-l+1} - n_{i-l})}{(V_{i-l+2} - V_{i-l+1})(V_{i-l+1} - V_{i-l})(V_{i-l+2} - V_{i-l})}$$

$$\hat{b}_i = \frac{1}{L+1} \sum_{l=0}^{L} \left( \frac{n_{i-l+1} - n_{i-l}}{V_{i-l+1} - V_{i-l}} - \frac{(V_{i-l+1} - V_{i-l})(n_{i-l+2} - n_{i-l+1}) - (V_{i-l+2} - V_{i-l+1})(n_{i-l+1} - n_{i-l})}{(V_{i-l+2} - V_{i-l+1})(V_{i-l+1} - V_{i-l})(V_{i-l+2} - V_{i-l})}(V_{i-l} + V_{i-l+1}) \right)$$

$$V_i^* = -\frac{\hat{b}_i}{\hat{a}_i}$$

where i is an index of the current iteration, L is a non-negative integer smaller than or equal to i, $V_l$ is an element of the vector $V_l$ comprising the values $V_i^*$ determined previously and said values $V^{left}$, $V^{max}$, $V^{right}$, these values being taken in ascending order, and $n_l$ is the value of the sharpness indicator measured when the focusing parameter takes the value $V_l$.

9. The method of claim 7, wherein, during said step b), said value of the focusing parameter, which value is denoted by $V_i^*$, is calculated by applying the formulae:

$$\hat{a}_i = \frac{1}{M} \sum_{(i,j) \in \Omega} \frac{\mathcal{G}_i - \mathcal{G}_j}{V_i - V_j}$$

$$\hat{b}_i = \frac{1}{L-1} \sum_{l=1}^{L-1} (\mathcal{G}_l - \hat{a} V_l)$$

$$V_i^* = -\frac{\hat{b}_i}{\hat{a}_i}$$

where i is an index of the current iteration, $\Omega$ is a set of all of pairs of non-repeated indices l with values between max(0, i-L) and i, L being a non-negative integer smaller than or equal to i, $V_1$ is an element of a vector $V_l$ comprising the values $V_i^*$ determined previously and said values $V^{left}$, $V^{max}$, $V^{right}$, these values being taken in ascending order, $n_1$ is a value of the sharpness indicator measured when the focusing parameter takes the value $V_1$ and $$\mathcal{G}_l = \frac{n_{l+1} - n_l}{V_{l+1} - V_l}.$$

10. The method of claim 1, wherein said first phase further comprises a step of selection of a law for sampling a range of values of the focusing parameter, and wherein said predefined values of said focusing parameter are obtained by sampling said range in accordance with said law.

11. The method of claim 1, wherein said focusing parameter is chosen from among:
 a position of the at least one lens with respect to the image sensor along an optical axis; and
 a vergence of the lens.

12. The method of claim 1, wherein, between an end of the first phase and a beginning of the second phase, said actuator is controlled so that said focusing parameter regains an initial value.

13. A system for automatically focusing a camera, comprising:
 an actuator configured to modify a focusing parameter of a lens of the camera; and
 a processor configured to receive, at an input, a signal representative of an image acquired by an image sensor of the camera and to produce, at an output, a signal for controlling said actuator, said processor is configured or programmed to implement a method comprising:
 a first phase comprising:
  performing an open-loop control of said actuator, such that said focusing parameter successively takes a plurality of predefined values;
  acquiring a plurality of images by means of said sensor, each corresponding to one said predefined value of the focusing parameter; and
  calculating a plurality of sharpness indicators respectively on the basis of each of said images; and
 a second phase of controlling, in a closed loop, said actuator so as to maximize each of said plurality of sharpness indicators,
 said second closed-loop control phase being implemented by making use of both a control law and starting conditions determined on the basis of the plurality of sharpness indicators calculated during said first phase.

14. A camera having an image sensor, at least one lens configured to project an image onto said sensor and an automatic focusing system, the automatic focusing system comprising an actuator configured to modify a focusing parameter of said at least one lens and a processor configured to receive, at an input, a signal representative of an image acquired by said image sensor and to produce, at an output, a signal for controlling said actuator, wherein said processor is configured or programmed to implement a method comprising:
 a first phase comprising:
  performing an open-loop control of said actuator, such that said focusing parameter successively takes a plurality of predefined values;
  acquiring a plurality of images by means of said sensor, each corresponding to one said predefined value of the focusing parameter; and
  calculating a plurality of sharpness indicators respectively on the basis of each of said images; and
 a second phase of controlling, in a closed loop, said actuator so as to maximize each of said plurality of sharpness indicators,
 said second closed-loop control phase being implemented by making use of both a control law and starting conditions determined on the basis of the plurality of sharpness indicators calculated during said first phase.

15. The camera of claim 14, wherein said at least one lens is a variable focus lens and said actuator is configured to modify the focal length of the at least one lens.

* * * * *